(12) United States Patent
Tanji

(10) Patent No.: US 6,437,228 B2
(45) Date of Patent: Aug. 20, 2002

(54) METHOD AND APPARATUS FOR STORING AUDIO DATA

(75) Inventor: Ryoji Tanji, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/774,856

(22) Filed: Jan. 31, 2001

(30) Foreign Application Priority Data

Feb. 1, 2000 (JP) .......................................... 12-024481

(51) Int. Cl.$^7$ .............................. G10H 1/26; G10H 7/00
(52) U.S. Cl. ...................................... 84/609; 434/307 A
(58) Field of Search .................. 84/609–614, 634–638; 434/307 A

(56) References Cited

U.S. PATENT DOCUMENTS 5,321,198 A   6/1994   Suzuki et al.
5,525,748 A   6/1996   Kuribayashi et al.

*Primary Examiner*—Stanley J. Witkowski
(74) *Attorney, Agent, or Firm*—Morrison & Foerster LLP

(57) ABSTRACT

When audio data are to be stored into a large-capacity memory such as a hard disk device, a shared storage section is set in the memory so as to be used both for storing audio data of one or more songs and for storing song management data for each of the songs that are necessary for reproduction of the audio data. The song management data include data indicative of a stored position, in the shared storage section, of the corresponding audio data. The audio data are sequentially stored into the shared storage section in a predetermined single direction, e.g. from one end toward another of the shared storage section. The song management data are sequentially stored into the shared storage section in an opposite direction to the predetermined single direction, e.g. from the other end toward the one end of the shared storage section.

32 Claims, 5 Drawing Sheets

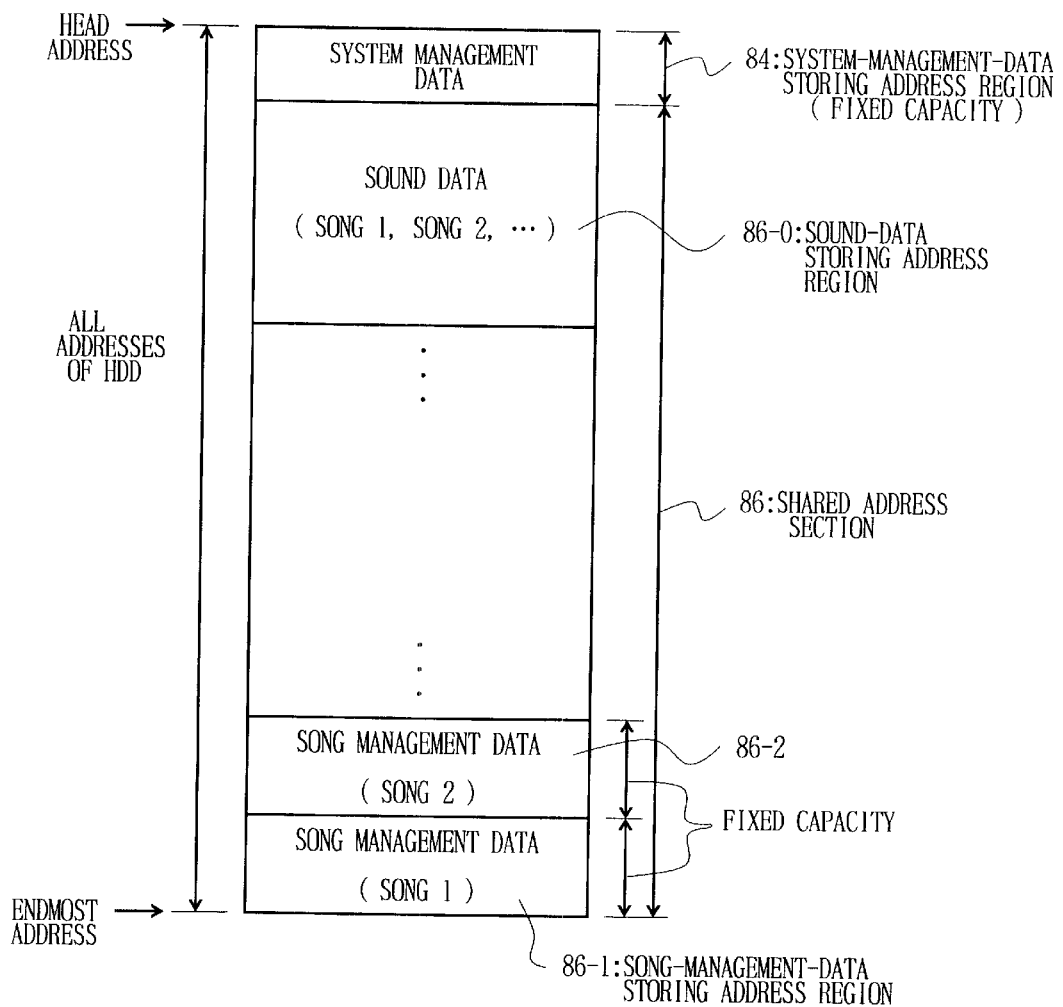
F I G. 1

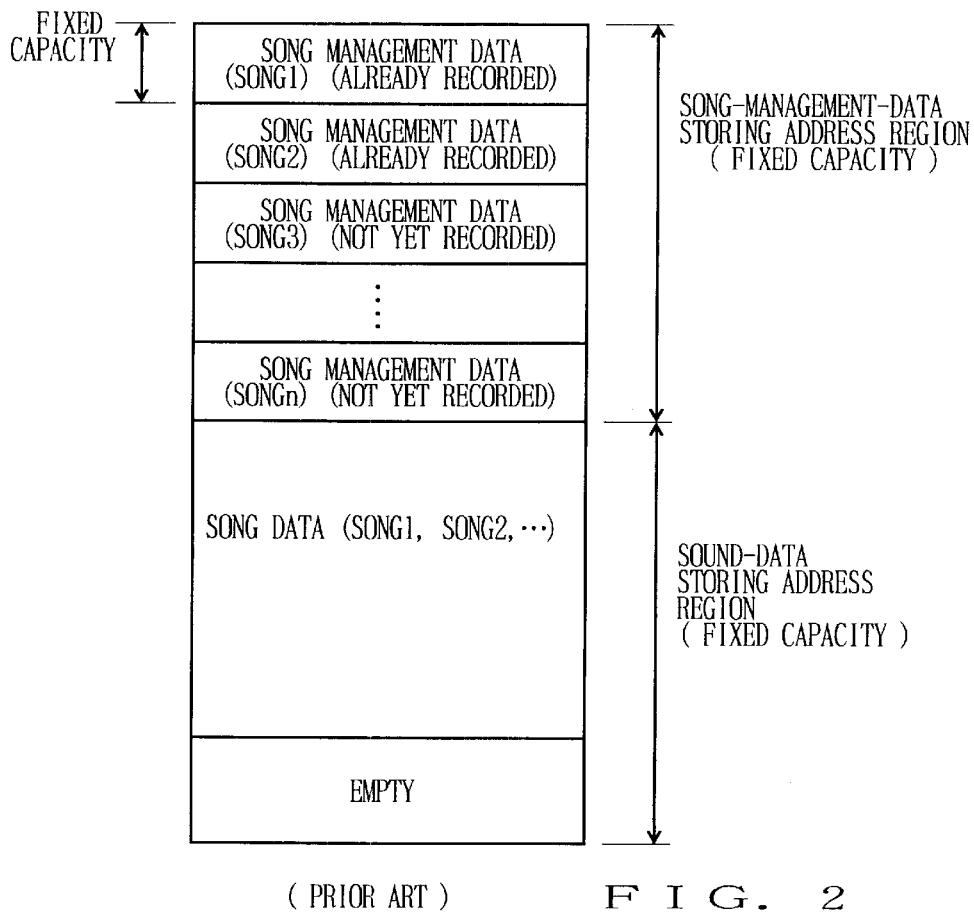
( PRIOR ART )   F I G. 2
SONG MANAGEMENT DATA
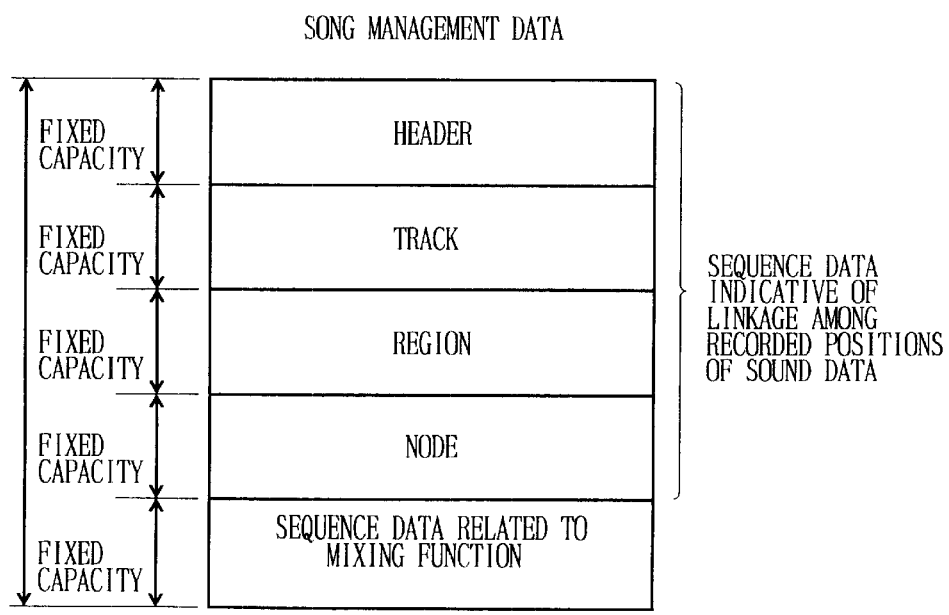
F I G. 5

METHOD AND APPARATUS FOR STORING AUDIO DATA

BACKGROUND OF THE INVENTION

The present invention relates to an improved method and apparatus for storing audio data into a memory, such as an external storage device like a hard disk device (HDD), and also relates to an audio-data recording/reproduction method and apparatus using the improved audio-data storing method. More particularly, the present invention concerns a technique that allows a limited storage capacity of the memory to be used efficiently with no waste.

In digital audio recorders, such as digital mixing recorders, using an external storage device like a hard disk device (HDD), a file of song management data is created for each song (which is one complete unit of music to be recorded or reproduced and corresponds, for example, to a single piece of music), so as to manage sound data (waveform data) stored in the external storage device. The song management data for each song include various information necessary for reproducing the song, which includes data indicative of recorded locations, on the external storage device, of a series of the song-constituting sound or audio data. FIG. 2 shows an exemplary format in which audio data are stored in predetermined address regions of an external storage device in a conventionally-known digital audio recorder. Specifically, the external storage device includes two separate previously-set address regions each having a fixed storage capacity: song-management-data storing address region; and sound-data storing address region. In the song-management-data storing address region, there are stored song management data for individual songs. Storage capacity allocated to the song management data for each song is fixed in the illustrated example, which would thus fix the maximum number of songs storable in the song-management-data storing address region. In the sound-data storing address region, sound data of individual takes—each take corresponding to a recording on one occasion—are stored for each of predetermined recording units such as clusters. Same sound data may be used more than once in one song or may be shared among a plurality of songs.

When reproduction of a given song is instructed, access is made to particular addresses in the song-management-data storing address region where are stored the song management data of the given song, so as to read out the song management data. Then, on the basis of the read-out song management data, access is made sequentially to particular addresses in the sound-data storing address region where are stored the sound data of the given song, for reproduction of the given song.

While the song management data for each song generally has a fixed size, the sound data for each song has a variable size that varies with the time length of the song and a total number of tracks in the song. Therefore, in a situation where all the stored sound data have a large total size although only a smaller number of songs have been stored, the conventional sound-data storage format of FIG. 2 would present the following inconvenience. Namely, if the sound-data storing address region have become full before the number of songs stored in the song-management-data storing address region reaches the maximum number (i.e., even when there is still a vacancy in the song-management-data storing address region), no more song can be stored any longer, which would result in significant waste of the song-management-data storing address region. Conversely, if songs of small sizes are stored and the number of songs stored in the song-management-data storing address region has reached the maximum number even when there is still a vacancy in the sound-data storing address region, no more song can be stored any longer, which would result in significant waste of the sound-data storing address region.

SUMMARY OF THE INVENTION

In view of the foregoing, it is an object of the present invention to provide an improved audio-data storing method and apparatus which allow a storage capacity of an external storage device to be effectively used with no waste, and audio-data recording/reproduction method and apparatus using such an audio-data storing method.

In order to accomplish the above-mentioned object, the present invention provides a method of storing audio data into a memory, which comprises the steps of: setting, in the memory, a shared storage section to be used both for storing audio data of one or more songs and for storing song management data for each of the songs that are necessary for reproduction of the audio data, the song management data including data indicative of a stored position, in the shared storage section, of the audio data corresponding thereto; performing control for sequentially storing the audio data into the shared storage section in a predetermined single direction; and performing control for sequentially storing the song management data into the shared storage section in an opposite direction to the predetermined single direction. The method according to the present invention may further comprise a step of storing, into a predetermined region, system management data including data indicative of a stored position, in the shared storage section, of the song management data for each of the songs.

The position where storage of the audio data is to be started can be set, for example, to one end or near the one end of the shared storage section of the memory, and the position where storage of the song management data is to be started can be set, for example, to the other end or near the other end of the shared storage section of the memory.

In the memory (e.g., large-capacity memory or external storage device like a hard disk device) of the present invention, a shared storage section is set which is to be used both for storing the audio data (i.e., sound data constituting a body of a song) and for storing the song management data for each song that include data indicative of the stored position of the audio data (i.e., data for a user to know the recorded position of the sound data) and that are necessary for reproducing the audio data. The audio data and song management data are stored into shared storage section in opposite directions; for example, the audio data are sequentially stored into the shared storage section in one direction from one end toward the other end of the shared storage section while the song management data are sequentially stored into the shared storage section in the opposite direction from the other end toward the one end of the shared storage section, or vice versa. With this arrangement, the data can be stored until the shared storage section becomes full or substantially full, so that the storage capacity of the memory can be used effectively with no waste. If an address region for storing the song management data for each individual song is set to a fixed storage capacity, the recording start position of the song management data for each of the songs can be determined previously. Thus, even in the case where the song management data are sequentially stored into the shared storage section in the direction from the other end toward the one end of the shared storage section, it is possible to eliminate a need for complicated arithmetic operations to determine the recording start position when recording the song management data for each of the songs. Note that even where the song management data for the individual songs are stored in the opposite direction to the normal address-advancing (address-incrementing) direction, individual component data of the song management data for each individual song may be stored in the address-advancing direction; the audio data may be stored in a similar manner to the song management data. Namely, in this case, the direction in which only each block of the data is crammed into the memory is made opposite to the normal address-advancing direction, and the individual data in the block are stored in the address-advancing direction. Of course, the present invention is not so limited, and the individual data in the block may also be stored in the opposite direction to the address-advancing direction. Also, the audio data of each song may be recorded dispersedly in the shared storage section, in which case the song management data for the song may include sequence data that are indicative of a linkage among the recorded positions of the audio data so as to reproduce a series of the audio data of the song.

The method according to the present invention may further comprise the steps of: reading out, from the memory, the song management data of any one of the songs to be reproduced; and reading out, from the memory, the audio data on the basis of the song management data read out from the memory.

The method according to the present invention may further comprise the steps of: storing, into a predetermined region, system management data including data indicative of a stored position, in the shared storage section, of the song management data for each of the songs; reading out, from the memory, the song management data of any one of the songs to be reproduced, on the basis of the system management data; and reading out, from the memory, the audio data on the basis of the song management data read out from the memory.

In a preferred implementation, the memory is an external storage device, and the step of reading out, from the memory, the song management data includes a step of reading out, from the external storage device, the song management data of the song to be reproduced and storing the read-out song management data into an inner storage device. Further, the step of reading out, from the memory, the audio data may access the external storage device on the basis of the song management data stored in the inner storage device.

Further, in a preferred embodiment, the step of performing control for sequentially storing the audio data into the shared storage section performs control such that the audio data are sequentially stored into the shared storage section in a direction from one end toward another end of the shared storage section, and the step of performing control for sequentially storing the song management data into the shared storage section performs control such that the song management data are sequentially stored into the shared storage section in a direction from the other end toward the one end of the shared storage section. A region in the shared storage section for storing the song management data for each individual song may have a fixed storage capacity, and the system management data may include information indicative of an address at the other end of the shared storage section. Further, the step of reading out, from the memory, the song management data may includes: a step of performing, on the basis of the address at the other end of the shared storage section and the fixed storage capacity of the region, an arithmetic operation to determine an address region of the external storage device where the song management data of the song to be reproduced are stored; and a step of accessing the address region of the external storage device to read out the song management data of the song to be reproduced and then storing the read-out song management data into an inner storage device.

The present invention may be constructed and implemented not only as the method invention as discussed above but also as an apparatus invention. Also, the present invention may be arranged and implemented as a software program for execution by a processor such as a computer or DSP, as well as a storage medium storing such a program. Further, the present invention may be implemented as a machine-readable storage medium storing performance data based on the principles of the invention. Furthermore, the processor used in the present invention may comprise a dedicated processor based on predetermined fixed hardware circuitry, rather than a CPU or other general-purpose type processor capable of operating by software.

BRIEF DESCRIPTION OF THE DRAWINGS

For better understanding of the object and other features of the present invention, its preferred embodiments will be described in greater detail hereinbelow with reference to the accompanying drawings, in which:

FIG. 1 is a diagram showing an embodiment of the present invention, which particularly shows how a memory employed in the embodiment is divided into various address regions;

FIG. 2 is a diagram showing an exemplary format in which audio data are stored in predetermined address regions of an external storage device in a conventionally-known digital audio recorder;

FIG. 5 is a diagram showing an exemplary format of the song management data.

DETAILED DESCRIPTION OF THE PREFERRED EMBODIMENTS

Figure 3:
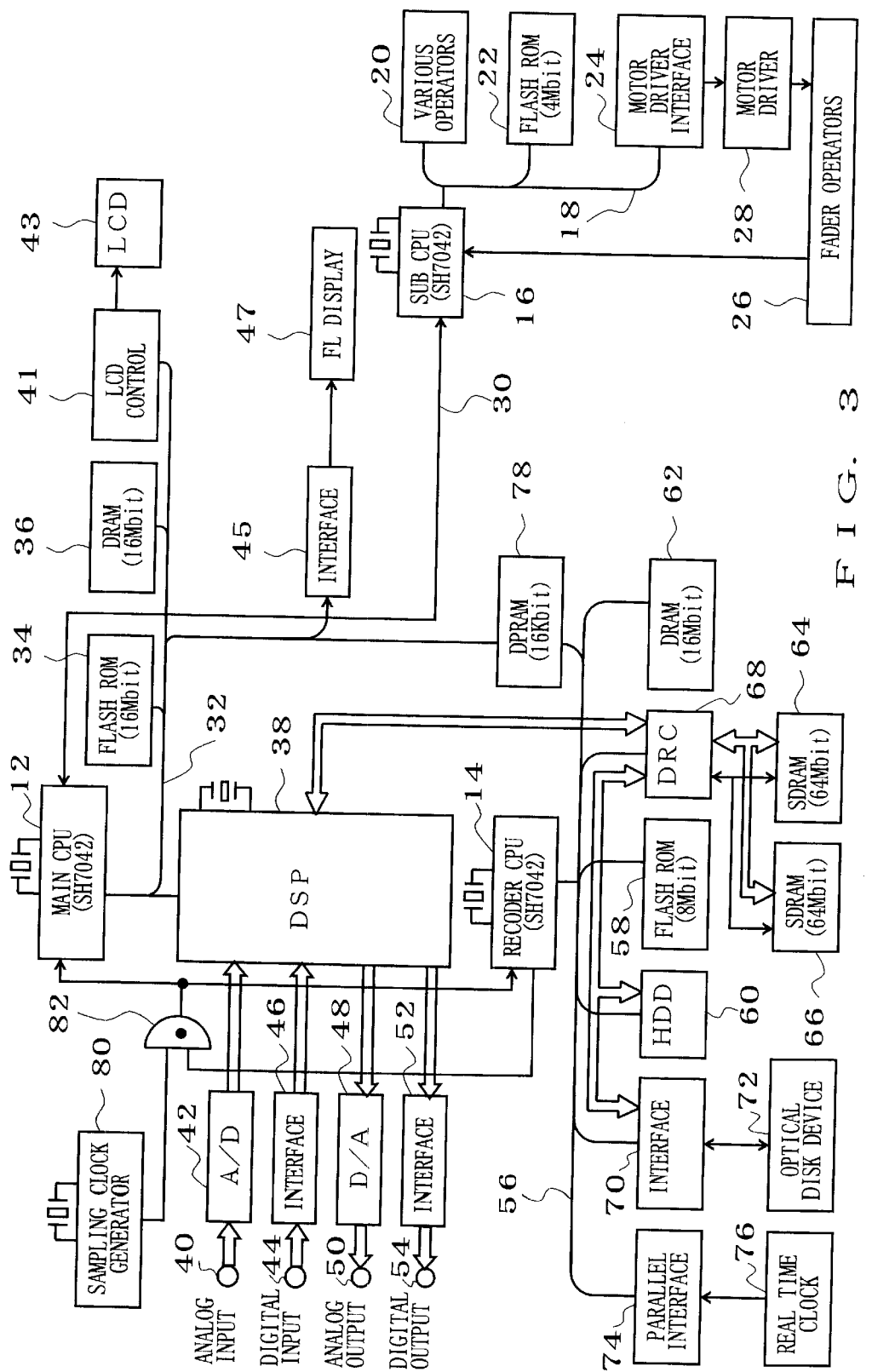
FIG. 3 is a block diagram showing a general setup of a hard disk recorder to which the basic principles of the present invention are applied.

Now, a detailed description will be made about an embodiment of the present invention to which the basic principles of the invention are applied to a digital mixing recorder (hard disk recorder) using a hard disk as its external storage device. FIG. 3 is a block diagram showing a general setup of the hard disk recorder 10 which includes signal paths of a plurality of channels. The term "channels" is used herein to refer to not only signal paths to be used for processing signals of sound data of individual tracks but also sound data themselves transmitted via the signal paths. Also note that the terms "signal paths" refer to not only signal paths physically separated from each other on a channel-by-channel basis but also a physically shared signal path by which the sound data of the individual channels are processed on a time divisional basis. With these signal paths and channels, the hard disk recorder 10 of the invention is capable of simultaneous recording or reproduction of a plurality of tracks (e.g., up to 16 tracks), or simultaneous recording and reproduction of a plurality of tracks (e.g., simultaneous recording of up to 8 tracks concurrent with reproduction of up to 16 channels). In each of the tracks, every sample of the sound data consists of 16 bits (two bytes), except for a mix-down or track-down signal that consists of 24 bits (three bytes).

As illustrated in FIG. 3, the hard disk recorder 10 includes a total of three one-chip CPUs (microcomputers), a main CPU 12, a recorder CPU 14, a sub-CPU 16; for example, the one-chip CPUs may each be a "SH7042" single-chip RISC microcomputer commercially available from HITACHI, Ltd. These CPUs 12, 14 and 16 are driven independently of each other by their respective clocks that operate asynchronously with each other. The main CPU 12 chiefly performs mixing control as will be later described. In accordance with instructions from the main CPU 12, the recorder CPU 14 controls recording and reproduction to and from the hard disk (HDD) 60 and also performs waveform editing control and the like. The sub-CPU 16 performs control to deliver various operation information, input via a human operator, to the main CPU 12, and also performs motor drive control for individual fader operators and other control in accordance with instructions from the main CPU 12.

To a bus 18 of the sub-CPU 16 are connected various operators 20 including switches, rotary knobs, mouse, jog dial, shuttle knob and the like, a flash ROM 22 having stored therein programs for execution by the sub-CPU 16, a motor driver interface 24, etc. A plurality of motor-driven fader operators 26 are connected to the motor driver interface 24 via a motor driver 28. Information indicating an operating position of each of the motor-driven fader operators 26 is delivered to the sub-CPU 16. Manipulation of the various operators 20 by the human operator can set mixing parameters, such as parameters for routing or assignment of each individual input channel to indicate on which track the input channel should be recorded via which signal path channel, parameters for routing or assignment of each track-reproduced signal to indicate from which output channel the track-reproduced signal should be output via which signal path channel, and parameters for setting equalizer characteristics, effect characteristics, sound image localization (panning) etc. Also, the manipulation of the various operators 20 by the human operator can instruct execution of various recorder functions such as recording, reproduction, stop, pause, slow reproduction, fast forwarding and fast rewinding, selection of a song, switching between recording/reproduction and editing modes, and waveform editing. The recording/reproduction mode includes a mode in which normal recording/reproduction (i.e., only recording (ALL REC), only reproduction or simultaneous recording and reproduction(SYNC DUBBING)) is carried out for each performance part, a mode in which a punch-in or punch-out operation is performed, and a mode in which a mix-down operation is performed. Information indicative of the manipulation of each of the operators 20 is passed to the sub-CPU 16, from which the information is delivered via a signal line 30 to the main CPU 12. In response to operation by a human operator, the fader operators 26 adjust respective levels of the individual input channels and output channels, levels of stereo outputs, etc., and information indicative of manipulation of each of the fader operators 26 is passed to the sub-CPU 16, from which the information is delivered via the signal line 30 to the main CPU 12. In the recording/reproduction mode, i.e. the mode where only recording (ALL REC), only reproduction or simultaneous recording and reproduction (SYNC DUBBING) is carried out, the main CPU 12 instructs operating positions of the individual fader operators 26 sequentially to the sub-CPU 16 via the signal line 30 in accordance with progression of a music piece performance, for fader level adjustment of the individual reproduction tracks. Thus, via the motor driver interface 24 and motor driver 28, the individual fader operators 26 are controlled to automatically move to the respective instructed operating positions. In this way, the operating positions of the fader operators 26 that were set at the time of the recording are reproduced so that reproduction is carried out with the reproduction level of each of the tracks automatically adjusted to the level that was set at the time of the recording.

To a bus 32 of the main CPU 12, as further shown in FIG. 3, are connected a flash ROM 34 having stored therein programs for execution by the main CPU 12, and a DRAM 36 functioning as a working memory for the CPU 12 and also storing, as song management data related to mixing functions (routing, equalizing, effect imparting, fader level adjusting, sound-image-localization adjusting and other functions) for a song currently designated for recording, reproduction, editing or the like, sequence data related to time-varying settings of the mixing parameters. Also connected to the bus 32 of the main CPU 12 are a DSP 38 implementing the mixing functions, an LCD control circuit 41 connected with an LCD (Liquid Crystal Display) 43, an interface 45 connected with a fluorescent (FL) display 47, etc. Information corresponding to a current operation mode is displayed on the LCD 43; in the recording/reproduction mode, for example, information is displayed for selection of signal routing, ON/OFF states of the channels and virtual tracks, etc. In the waveform editing mode, a waveform to be edited is graphically shown on the LCD 43. On the fluorescent (FL) display 47 are displayed time information (time code) in a numerical value, levels of input signals or reproduced signals to or from the individual channels in a bar graph, etc. Note that the "virtual tracks" are imaginary tracks allocated to the respective tracks (i.e. real tracks). In the reproduction or simultaneous recording/reproduction, recorded data can be reproduced by selecting, one by one, the virtual tracks allocated to the real tracks to be reproduced. For example, in a situation where the number of the real tracks is "16" and the number of the virtual tracks allocated to each of the real tracks is "8", a total of 128 virtual tracks can be provided.

The DSP 38 provides a mixing processing section for a plurality of channels. On the basis of manipulation, by the human operator, of the operators 20 and fader operators 26 or in accordance with mixing-function-related sequence data stored in the DRAM 36, the mixing processing section performs mixing processing to execute, for recording inputs and reproduction outputs, instructions that are issued from the main CPU 12 for routing, equalizing, effect imparting, fader level adjusting, sound-image-localization adjusting and other mixing functions.

Analog sound signals (recording inputs) of a plurality of channels (e.g., eight channels at the maximum) input via an analog input terminal 40 of FIG. 3 are gain-controlled to appropriate signal levels and then passed to an A/D converter 42 for conversion into digital representation, from which the converted digital sound signals are supplied to the DSP 38 for mixing processing. Digital sound signals (recording inputs) of a plurality of channels (e.g., 16 channels at the maximum) input via a digital input terminal 44 are supplied via an interface 46 to the DSP 38 for mixing processing. The recording inputs having been subjected to the mixing processing is recorded onto an HDD 60 as will be later described. Digital sound signals (reproduction outputs) of a plurality of channels (e.g., 16 channels at the maximum) reproduced from the HDD 60 are mixed by the DSP 38 and then output from a digital output terminal 54 via an interface 52. Further, two-channel stereo signals obtained by the DSP 38 mixing the digital sound signals are converted by a D/A converter 48 into analog representation are output from an analog output terminal 50 for monitoring or other purposes.

To a bus 56 of the recorder CPU 14 are connected a flash ROM 58 having stored therein programs for execution by the recorder CPU 14, the HDD 60 corresponding to the external storage device of the present invention, a DRAM 62 corresponding to an inner storage device of the present invention, and a DRAM controller (DRC) 68 for controlling data write/read to/from the synchronous DRAMs (SDRAMs) 64 and 66 each functioning as a buffer memory. Optical disk device 72, such as a CD-RW device, is also connected via an interface 70 to the bus 56 of the recorder CPU 14. Real time clock 76 for generating data indicative of a current date and time is connected via a parallel interface 74 to the bus 56 of the recorder CPU 14. The optical disk device 72 is used to back up or copy any desired one of the songs recorded on the HDD 60 onto a CD-R or CD-RW disk, or update a particular one of the programs in the flash ROM 22, 34 and 58 by reproducing a version upgrading program from a CD-ROM or the like and thereby replacing the particular program with the upgrading program. System management data, sound data, song management data, etc. are recorded on the HDD 60 in a manner to be described later.

Into the DRAM 62 connected to the recorder CPU 14, there are stored the system management data read out from the HDD 60, as well as sequence data indicative of a linkage among recorded locations on the HDD 60 included in the song management data related to a song currently designated for recording, reproduction, editing or the like. The DRAM 62 also functions as a working memory for the recorder CPU 14. Note that between the DSP 38 and the DRAM controller (DRC) 68, the sound data are transmitted via signals lines (not shown) rather than via the buses 32 and 56.

The bus 32 of the main CPU 12 and bus 56 of the recorder CPU 14 are interconnected via a dual-port RAM (DPRAM) 78, so that various instructions, song management data and other information are transmitted via these buses between the main CPU 12 and the recorder CPU 14. Sampling clock generator 80 generates clock pulses of a predetermined sampling frequency that are given to an AND circuit 82. The recorder CPU 14 outputs an operation-section designating signal that rises in synchronism with a start of recording or reproduction and falls in synchronism with an end of the recording or reproduction, and the operation-section designating signal is passed to the AND circuit 82. This way, the AND circuit 82 generates section sampling clock pulses from the start to end of the recording or reproduction. These sampling clock pulses are fed to external clock input terminals of the main CPU 12 and recorder CPU 14. Each of the main CPU 12 and recorder CPU 14 contains a counter for counting the clock pulses received via the external clock input terminal. The counters of the main CPU 12 and recorder CPU 14 are reset in synchronism with the start of the recording or reproduction and then count the sampling clock pulses. The main CPU 12 performs the mixing processing per sampling clock pulse in accordance with the counted value. Further, The recorder CPU 14 controls the data write/read to/from the HDD 60 and synchronous DRAMs (SDRAMs) 64 and 66 per sampling clock pulse in accordance with the counted value. This way, the main CPU 12 and recorder CPU 14 operate in synchronism with each other with respect to each sampling frequency (e.g., 48 kHz, 44.1 kHz or the like) while operating on their respective operation clocks (e.g., 28 MHz), and thus can perform the recording and reproduction control independently and in parallel to each other.

Figure 4:
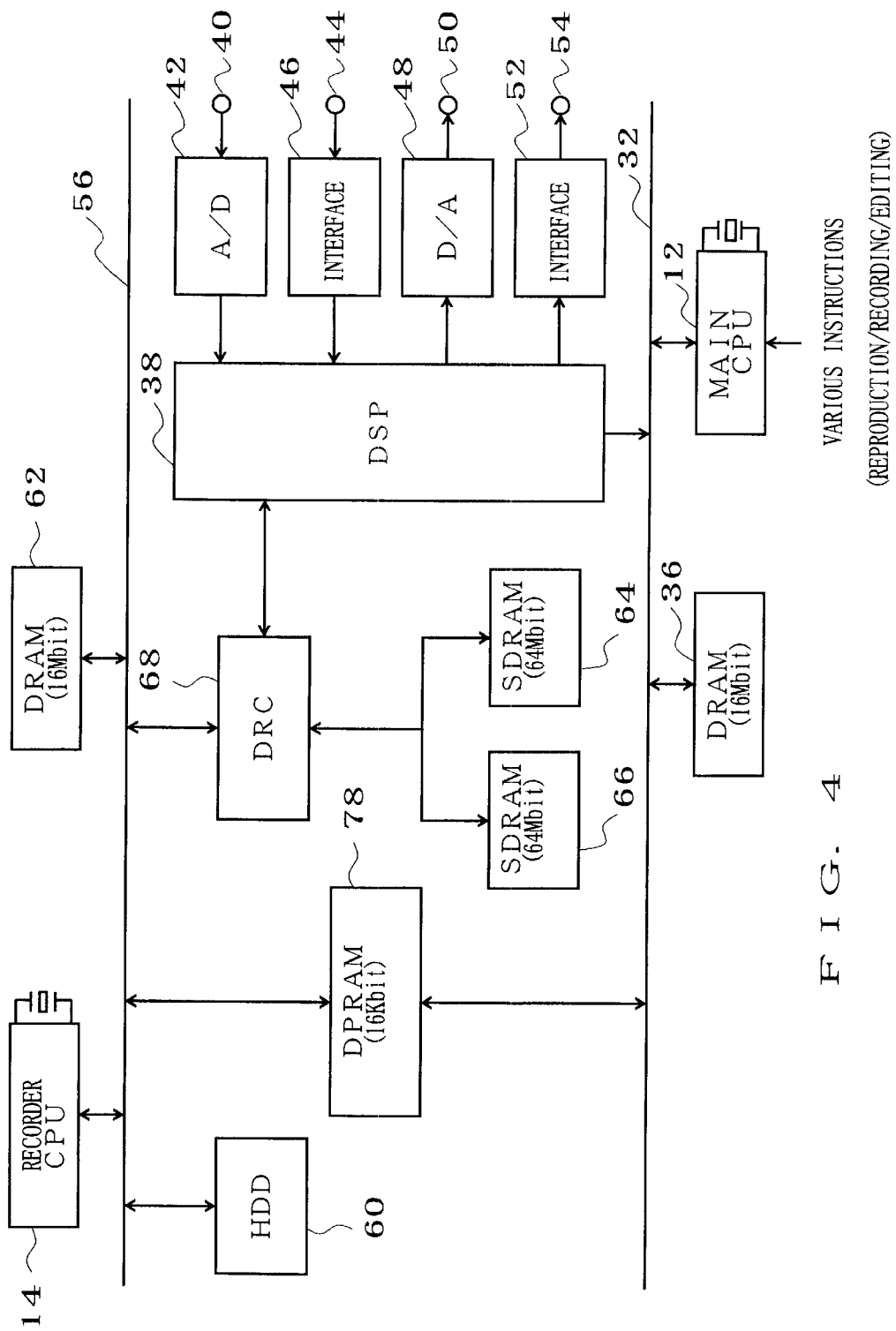
FIG. 4 is a block diagram showing principal components of the hard disk recorder of FIG. 3 which are engaged in communication of system management data, sound data and song management data.

The following paragraphs describe the transfer of the data (sound data, system management data, song management data, etc.) in the recording/reproduction mode of the hard disk recorder 10 shown in FIG. 3, with reference to FIG. 4. Upon power-on of the hard disk recorder 10, the system management data are read out from the system-management-data storing address region of the HDD 60 and delivered via the bus 56 to the DRAM 62 for storage therein. Then, once a desired song is designated, the recorder CPU 14 refers to the system management data stored in the DRAM 62 and then accesses a portion of a song-management-data storing address region of the HDD 60 where are stored the song management data of the designated song, so as to read out the song management data from the song-management-data storing address region. Of the read-out song management data, the sequence data related to the mixing function of the designated song are transferred via the bus 56, dual-port RAM 78 and bus 32 to the DRAM 36. Further, of the read-out song management data, the sequence data indicative of the linkage among the recorded positions of a series of the sound data of that song are transferred via the bus 56 to the DRAM 62. In this way, various processes, such as recording, reproduction and waveform editing, can be performed for the designated song in accordance with instructions from the human operator. Note that for each song to be recorded for the first time, a new file of the song is created (i.e., a new song-management-data storing address region is initialized and secured in the HDD 60), in advance, in accordance with manipulation by the human operator. Song management data of the new song are stored into the DRAMs 36 and 62 so that the hard disk recorder 10 is placed in a state capable of recording the song.

In the recording/reproduction mode, the following operations are performed on each track for which recording has been instructed. Each recording signal (sound data) for the track, introduced via the analog input terminal 40 or digital input terminal 44, is passed via the A/D converter 42 or interface 46 to the DSP 38, where the mixing processing is performed on the recording signal in accordance with manipulation, by the human operator, any of the operators 20 and fader operators 26. The recording signal having been subjected to the mixing processing is sequentially stored from the DRAM controller (DRC) 68, via the predetermined signal line that is separate from the bus 56, into the synchronous DRAMs (SDRAMs) 64 and 66 constituting a buffer memory. The sound data thus stored in the synchronous DRAMs 64 and 66 are transferred periodically via the bus onto the HDD 60 in a DMA (Direct Memory Access) fashion. Of system management data and song management data to be newly created this time, sequence data indicative of the linkage among the reproduced positions are sequentially accumulated into the DRAM 62, and sequence data related to the mixing function are sequentially accumulated into the DRAM 36. In response to a data storing operation after the recording, the sequence data related to the mixing function are delivered via the dual-port-RAM 78 to the bus 56. Thus, the sequence data are overwritten into the song-management-data storing address region of the HDD 60 for storing the song management data of the song, along with data indicative of the linkage among the recorded positions, on the HDD 60, of the sound data accumulated in the DRAM 62. In addition, the system management data stored in the DRAM 62 are overwritten into the system-management-data storing address region of the HDD 60.

In the recording/reproduction mode, the following operations are performed on each track for which reproduction has been instructed. The recorder CPU 14 refers to data indicative of the linkage among the reproduced positions of the track stored in the DRAM 62 and thus sequentially reads out the corresponding sound data from the HDD 60. The read-out sound data are transferred in the DMA (Direct Memory Access) fashion, via the bus 56 and DRAM controller 68, to the synchronous DRAMs 64 and 66 for storage therein. The DRAM controller 68 sequentially reads out the sound data from the synchronous DRAMs 64 and 66 at the predetermined sampling frequency. The sound data read out from the synchronous DRAMs 64 and 66 are transferred from the DRAM controller 68, via the above-mentioned predetermined separate signal line, to the DSP 38. The main CPU 12 sets parameters for the DSP 38 by referring to the mixing-function-related sequence data stored in the DRAM 36, and then performs the mixing processing on the transferred sound data. The sound data having undergone the mixing processing are output from the digital output terminal 54 via the interface 52. Further, the signals having been mixed into two-channel stereo signals by the DSP 38 are converted via the D/A converter 48 into analog signals that are output from the analog output terminal 50. Note that in the recording/reproduction mode, signals of the individual tracks designated for the recording or reproduction are sequentially processed on the time-divisional basis, during which time the synchronous DRAMs 64 and 66 are switched, on the time-divisional basis, between write and read modes depending on whether the currently designated track is a recording track or reproducing track.

In FIG. 1, there is shown how the HDD 60 is divided into various address regions. As shown, the HDD 60 is divided into, in its start-to-end direction, the system-management-data storing address region 84 of a fixed storage capacity and a shared address (shared storage) section 86 following the system-management-data storing address region 84 and lying up to the endmost of the HDD 60. In the shared address section 86, channel-by-channel sound data are accumulatively recorded, sequentially in order of the takes, as digital signals from its fore end so that a sound-data storing region 86-0 is formed in a sequentially enlarged fashion, while song management data of individual songs are sequentially recorded from its rear end so that song-management-data storing address regions 86-1, 86-2, . . . are formed sequentially. The sound data are recorded in clusters each having a size of 128 K bytes. Note that each of the clusters is a 64 K word (samples) and, in the case of data in the CD format, becomes data of 1.45 sec. (i.e., 64/44.1 kHz=1.45 sec.). Once recorded, the sound data will not be deleted unless an instruction is given for deleting the corresponding take. In a situation where a plurality of tracks are recorded simultaneously, sound data of the individual tracks are recorded into the shared address section 86. Further, sound data to be added later by punch-in/punch-out or the like, waveform-edited sound data, or the like are recorded immediately following an end of already-recorded sound data in the shared address section 86 apart from addresses where sound data were recorded by initial recording on that track. Thus, sound data of each of the virtual tracks are recorded in the shared address section 86 dispersedly in clusters.

In the song-management-data storing address region 86-1, 86-2, . . . , for each of the songs, there are stored sequence data indicative of the linkage among the recorded addresses of the sound data for each of the virtual tracks which is necessary for reproducing the sound data of each virtual track contained in the song. In each of the song-management-data storing address region 86-1, 86-2, . . . , there are stored mixing-function-related sequence data for each of the virtual tracks included in the song. The song-management-data storing address region 86-1, 86-2, . . . , for each of the songs has a fixed storage capacity (i.e., 1.5 M bytes per song), and each time the human operator instructs creation of a new song file, a new song-management-data storing address region is initialized and allocated to the song. The thus-allocated song-management-data storing address region is updated each time sound data of that song is added such as by recording. Once set, the song-management-data storing address region 86-1, 86-2, . . . , for each of the songs is not deleted unless the human operator explicitly instructs deletion of the song. In the system-management-data storing address region 84, there are stored system management data including data that is indicative of the respective recorded positions of the song management data of the individual songs.

The song management data are recorded sequentially from the rear end of the HDD 60 on the song-by-song basis; however, it is to be noted that in each of the song-management-data storing address regions 86-1, 86-2, . . . , the data are recorded in a normal or forward direction, i.e. in an address-incrementing direction. Because each of the song-management-data storing address regions 86-1, 86-2, . . . has a fixed storage capacity as noted above, the respective start locations of the song-management-data storing address regions 86-1, 86-2, . . . can be arithmetically obtained by just recording, in the system-management-data storing address region 84, the endmost address of the entire HDD 60. For example, the start location of the song-management-data storing address region 86-1 for the first song can be arithmetically determined by "(endmost address of all the address regions in the HDD 60)—(storage capacity of the song-management-data storing address region)." The addresses at the start locations of the song-management-data storing address regions 86-1, 86-2, . . . may be recorded in advance rather than being arithmetically determined in the above-mentioned manner. Although the endmost address of the shared address section has been described above as being coincident with the endmost address of the HDD 60, the present invention is not so limited and the endmost address of the shared address section may be set at any other suitable location.

With the above-described file arrangement, it is possible to automatically access the start address of the HDD 60 and read out the system management data when the hard disk recorder 10 is turned on. Then, when a desired song is designated, access can be made, on the basis of the system management data, to the song-management-data storing address region storing the song management data of the designated song. Then, when reproduction of the song is instructed, it is possible to sequentially access the addresses where the sound data are recorded, for each currently-selected virtual track of the song, so that the sound data of the individual virtual tracks can be reproduced.

Description is made here about examples of more specific contents of the system management data, sound data and song management data recorded on the HDD 60. The system management data include information indicative of the number of songs stored on the HDD 60, empty storage capacity and empty locations of the shared address section 86, foremost and endmost addresses of the shared address section 86, etc. The sound data include waveform data, name of the take to which the sound data belong, etc. In FIG. 5, there is shown an exemplary format of the song management data of a song. The song management data include sequence data indicative of a linkage among recorded positions of the sound data for each of the virtual tracks included in the song and sequence data related to the mixing function. Fixed storage capacity is allocated to both of the above-mentioned sequence data. The sequence data indicative of the linkage among the recorded positions of the sound data have a hierarchical organization; that is, the sequence data include, in a top-to-bottom direction, a header, tracks, regions and nodes, which have their respective fixed storage capacity. The header includes information indicative of a name and date of creation of the song, virtual track number currently selected for each of the tracks in the song, etc. The "track" includes information indicative of respective names of the individual tracks (e.g., 16 tracks), start region numbers of virtual tracks (e.g., a total of 128 virtual tracks) included in the tracks, etc. The "region" represents which take should be performed from where and up to where. Each virtual track is composed of a linkage of an optional number of regions. Normally, the "region" corresponds to a single take. The "region" includes information indicative of a unique number allocated to the region, performance start time of the region (i.e., time lapsed from a performance start time of the song), time length of the performance, unique number of a leading node in the region, next region number (except for a last region of the virtual track), etc. If a blank period is formed from termination of performance of a particular region to the performance start time of a next region, no performance (i.e., silent performance) is executed for the virtual track during that period. The "node" indicates at which locations on the HDD 60 are recorded the sound data constituting the take to be designated in the region. The "region" is made up of a linkage of an optional number of nodes, and the "node" represents one cluster of the sound data. Further, the "node" includes information indicative of a unique number allocated to the node, addresses—cluster number and a unique number of a next node (except for the last node in the region)—of the HDD 60 where are recorded the sound data to be designated by the node.

According to the above-mentioned hierarchical organization, selecting a desired song causes all the song management data of the selected song to be read out from the HDD 60 and stored into the DRAM 62. Then, once reproduction of the song is designated, the recorder CPU 14 identifies the virtual tracks selected for each of the tracks, from the header of the song management data stored in the DRAM 62. Further, the recorder CPU 14 identifies the leading region number of the corresponding virtual track from the "track" of the stored song management data, identifies the leading node number of the corresponding region from the "region" of the stored song management data, and identifies the cluster number of the corresponding cluster number from the "node" of the stored song management data. Then, the recorder CPU 14 accesses the corresponding cluster number of the HDD 60 to read out one cluster of the sound data recorded thereon, so as to perform (reproduce) the sound data upon arrival at the performance start time designated by the region. Because the node includes the information indicative of the next node number, the recorder CPU 14 sequentially identifies the linked node numbers to thereby acquire the corresponding cluster numbers, so that the sound data are sequentially read out from the corresponding cluster numbers of the HDD 60. Thus, for each of the selected virtual tracks, a series of the sound data included in the region is reproduced. If a particular node is reached where there is no information of the next node number, it means that the particular node is the last node in that region, so that after the readout of the sound data from the cluster designated by the node, the recorder CPU 14 identifies the next region number in the last region. Thus, operations similar to the above-mentioned are performed for the next region; that is, the recorder CPU 14 acquires the linked node numbers to thereby sequentially access the corresponding cluster numbers of the HDD 60, and then reproduce a series of the sound data included in that region. Thus, the sound data constituting the selected virtual tracks are sequentially reproduced from the linkage of the regions and linkage of the nodes included in each of the regions. If a particular region is reached where there is no information of the next region number, it means that the particular region is the last region of the virtual track, so that the instructed reproduction is brought to an end after reproduction of a series of the sound data included in the last region.

Figures 6A, 6B:
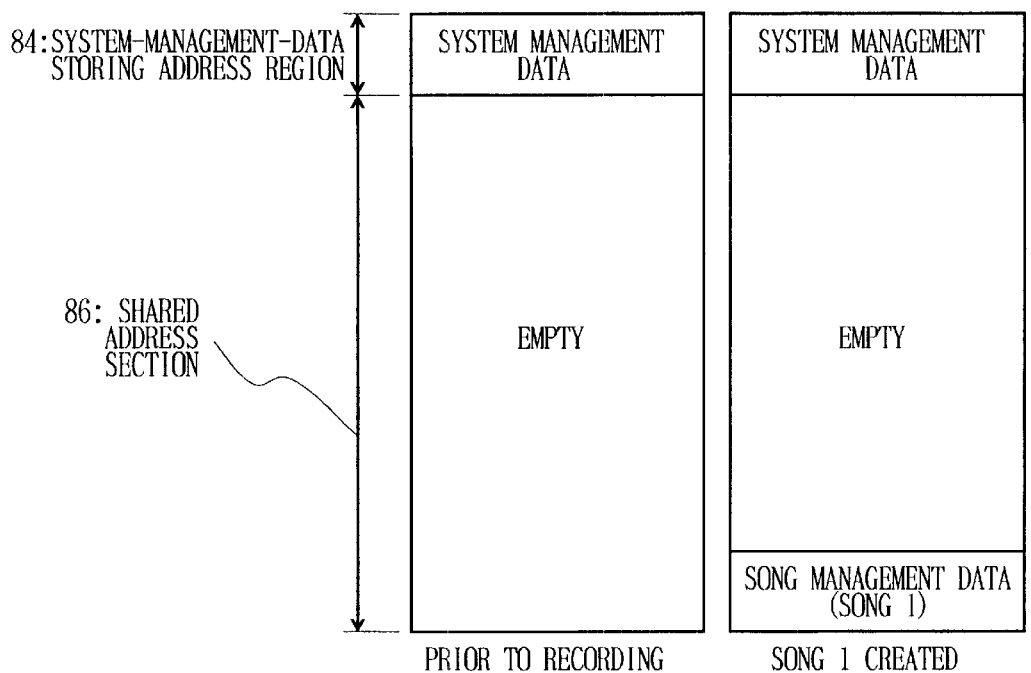
FIGS. 6A–6D are diagrams explanatory of an exemplary manner in which data accumulation progresses in a shared address section of an HDD shown in FIG. 3.
Figures 6C, 6D:
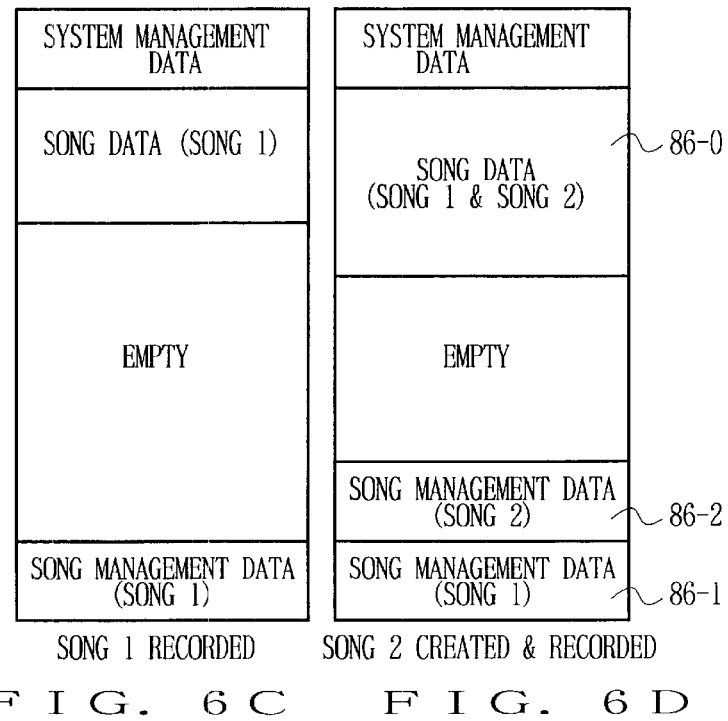

FIGS. 6A–6D are explanatory of an exemplary manner in which data accumulation progresses in the shared address section 86 of the HDD 60. First, only system management data are recorded into the system-management-data storing address region 84 with the entire shared address section 86 left empty, as shown in FIG. 6A. When creation of a file of a new song is instructed, a first song-management-data storing address region 86-1 is created in an area of the predetermined storage capacity starting at the rear end of the shared address section 86, as shown in FIG. 6B, and data settable prior to sound data recording, such as the song name, are recorded into the first song-management-data storing address region 86-1. Once recording (take) of the first song is initiated, the sound data are sequentially recorded from the fore end of the shared address section 86, as shown in FIG. 6C. Upon completion of the recording of the first song, the data in the song-management-data storing address region 86-1 are updated with data corresponding to the recorded contents. For next recording, the second or next song-management-data storing address region 86-2 is created immediately ahead of the first song-management-data storing address region 86-1, as shown in FIG. 6D. Once recording of the next song is initiated, the sound data of the next song are sequentially recorded following the already-recorded sound data in the shared address section 86. In this way, addition and recording of any desired song can be made until the shared address section 86 becomes full or substantially full.

The preferred embodiment has been described above as storing the sound data from the fore end of the shared address section and storing the song management data from the rear end of the shared address section. Alternatively, the song management data may be stored from the rear end of the shared address section and the sound data may be stored from the rear end of the shared address section. In such a case, the shared address section may be divided, from its rear end, into a plurality of regions each having a predetermined storage capacity so that the sound data are recorded into the divided regions, one by one, from the fore end thereof in the forward (address-incrementing) direction while sequentially switching from one divided region to another once the one divided region has become full. Further, whereas the preferred embodiment has been described above as employing a hard disk device as the external storage device, any other suitable external device may be employed such as an optical disk device, magneto-optic disk device or semiconductor memory. Furthermore, although the preferred embodiment has been described above in relation to the case where the basic principles of the present invention are applied to an audio-data recording/reproduction apparatus with an external storage device incorporated therein, the present invention may also be applied to any other type of audio-data recording/reproduction apparatus employing an external storage device provided outside the recording/reproduction apparatus. Moreover, although the preferred embodiment has been described above in relation to the case where the basic principles of the present invention are applied to a digital mixing recorder (hard disk recorder), the present invention may also be applied to digital recorders having no mixing function and recording/reproduction apparatus for any other type of audio data than the above-described. The audio data may be not only in the PCM format but also in any other suitable compressed or coded format.

What is claimed is:

1. A method of storing audio data into a memory comprising the steps of:
    setting, in said memory, a shared storage section to be used both for storing audio data of one or more songs and for storing song management data for each of the songs that are necessary for reproduction of the audio data, the song management data including data indicative of a stored position, in said shared storage section, of the audio data corresponding thereto;
    performing control for sequentially storing the audio data into said shared storage section in a predetermined single direction; and
    performing control for sequentially storing the song management data into said shared storage section in an opposite direction to the predetermined single direction.

2. A method as claimed in claim 1 wherein said step of performing control for sequentially storing the audio data into said shared storage section performs control such that the audio data are sequentially stored into said shared storage section in a direction from one end toward another end of said shared storage section, and wherein said step of performing control for sequentially storing the song management data into said shared storage section performs control such that the song management data are sequentially stored into said shared storage section in a direction from the other end toward the one end of said shared storage section.

3. A method as claimed in claim 1 wherein a region in said shared storage section for storing the song management data for each individual song has a fixed storage capacity.

4. A method as claimed in claim 1 wherein the audio data for each of the songs are stored dispersedly into said shared storage section, and wherein the song management data include sequence data indicative of a linkage among the audio data stored dispersedly in said shared storage section.

5. A method as claimed in claim 1 wherein said memory is an external storage device.

6. A method as claimed in claim 1, which further comprises a step of storing, into a predetermined region, system management data including data indicative of a stored position, in said shared storage section, of the song management data for each of the songs.

7. A method as claimed in claim 6 wherein said memory is an external storage device, and wherein said predetermined region storing the system management data is set separately from said shared storage section.

8. A method as claimed in claim 1 wherein a song corresponding to the song management data includes a plurality of tracks, each of the tracks including a plurality of virtual tracks each including a plurality of interlinked regions,
    wherein each of the regions is indicative of an arrangement of audio data on a time axis of the virtual track,
    wherein the song management data further include:
    selection information that, for each of said tracks, indicates a virtual track selected from among the plurality of virtual tracks; and
    performance start time information and performance time length information of each of the regions in each of the virtual tracks, and
    wherein said data indicative of a stored position in said shared storage section, included in the song management data, indicates stored positions, in said shared storage section, of the audio data corresponding to the regions.

9. A method as claimed in claim 8 wherein said memory has clusters as basic storage units thereof and the audio data are stored dispersedly in a plurality of the clusters in said shared storage section.
    wherein the song management data include a plurality of tinterlinked nodes, each of the nodes including address information indicative of an address of the cluster where the audio data is stored, and
    wherein said data indicative of a stored position in said shared storage section indicates any one of the interlinked nodes.

10. A method as claimed in claim 1, which further comprises the steps of:
    reading out, from said memory, the song management data of any one of the songs to be reproduced; and
    reading out, from said memory, the audio data on the basis of the song management data read out from said memory.

11. A method as claimed in claim 10 wherein said memory is an external storage device, and
    wherein said step of reading out, from said memory, the song management data includes a step of reading out, from said external storage device, the song management data of the song to be reproduced and storing the read-out song management data into an inner storage device, and
    said step of reading out, from said memory, the audio data accesses said external storage device on the basis of the song management data stored in said inner storage device.

12. A method as claimed in claim 1, which further comprises the steps of:
    storing, into a predetermined region, system management data including data indicative of a stored position, in said shared storage section, of the song management data for each of the songs;
    reading out, from said memory, the song management data of any one of the songs to be reproduced, on the basis of the system management data; and
    reading out, from said memory, the audio data on the basis of the song management data read out from said memory.

13. A method as claimed in claim 12 wherein said memory is an external storage device, and wherein said predetermined region storing the system management data is set separately from said shared storage section.

14. A method as claimed in claim 12 wherein said memory is an external storage device, and wherein said step of reading out, from said memory, the song management data includes a step of reading out, from said external storage device, the song management data of the song to be reproduced and storing the read-out song management data into an inner storage device, and said step of reading out, from said memory, the audio data accesses said external storage device on the basis of the song management data stored in said inner storage device.

15. A method as claimed in claim 14 wherein said step of performing control for sequentially storing the audio data into said shared storage section performs control such that the audio data are sequentially stored into said shared storage section in a direction from one end toward another end of said shared storage section, and said step of performing control for sequentially storing the song management data into said shared storage section performs control such that the song management data are sequentially stored into said shared storage section in a direction from the other end toward the one end of said shared storage section, wherein a region in said shared storage section for storing the song management data for each individual song has a fixed storage capacity, and the system management data includes information indicative of an address at the other end of said shared storage section, and wherein said step of reading out, from said memory, the song management data includes: a step of performing, on the basis of the address at the other end of said shared storage section and the fixed storage capacity of the region, an arithmetic operation to determine an address region of said external storage device where the song management data of the song to be reproduced are stored; and a step of accessing the address region of said external storage device to read out the song management data of the song to be reproduced and then storing the read-out song management data into said inner storage device.

16. An apparatus for storing audio data comprising:

a memory where a shared storage section is set to be used both for storing audio data of one or more songs and for storing song management data for each of the songs that are necessary for reproduction of the audio data, the song management data including data indicative of a stored position, in said shared storage section, of the audio data corresponding thereto; and a processor coupled with said memory and adapted to:
  perform control for sequentially storing the audio data into said shared storage section in a predetermined single direction; and
  perform control for sequentially storing the song management data into said shared storage section in an opposite direction to the predetermined single direction.

17. An apparatus as claimed in claim 16 wherein said processor is further adapted to store, into a predetermined region, system management data including data indicative of a stored position, in said shared storage section, of the song management data for each of the songs.

18. An apparatus as claimed in claim 16 wherein said processor is further adapted to:
  read out, from said memory, the song management data of any one of the songs to be reproduced; and
  read out, from said memory, the audio data on the basis of the song management data read out from said memory.

19. An apparatus as claimed in claim 18 wherein said memory is an external storage device, and wherein said processor reads out, from said external storage device, the song management data of the song to be reproduced, stores the read-out song management data into an inner storage device, and accesses said external storage device on the basis of the song management data stored in said inner storage device to thereby read out the audio data.

20. An apparatus as claimed in claim 16 wherein said processor is further adapted to:
  store, into a predetermined region, system management data including data indicative of a stored position, in said shared storage section, of the song management data for each of the songs;
  read out, from said memory, the song management data of any one of the songs to be reproduced, on the basis of the system management data; and
  read out, from said memory, the audio data on the basis of the song management data read out from said memory.

21. An apparatus as claimed in claim 20 wherein said memory is an external storage device, and wherein said predetermined region storing the system management data is set separately from said shared storage section.

22. An apparatus as claimed in claim 20 wherein said memory is an external storage device, and wherein said processor reads out, from said external storage device, the song management data of the song to be reproduced, stores the read-out song management data into an inner storage device, and accesses said external storage device on the basis of the song management data stored in said inner storage device to thereby read out the audio data.

23. An apparatus as claimed in claim 22 wherein said processor performs control such that the audio data are sequentially stored into said shared storage section in a direction from one end toward another end of said shared storage section, and also performs control such that the song management data are sequentially stored into said shared storage section in a direction from the other end toward the one end of said shared storage section, wherein a region in said shared storage section for storing the song management data for each individual song has a fixed storage capacity, and the system management data include information indicative of an address at the other end of said shared storage section, and wherein said processor performs, on the basis of the address at the other end of said shared storage section and the fixed storage capacity of the region, an arithmetic operation to determine an address region of said external storage device where the song management data of the song to be reproduced are stored, accesses the address region of said external storage device to read out the song management data of the song to be reproduced and then stores the read-out song management data into said external storage device.

24. A machine-readable storage medium containing a group of instructions to cause said machine to implement a method of storing audio data into a memory where a shared storage section is set to be used both for storing audio data of one or more songs and for storing song management data for each of the songs that are necessary for reproduction of the audio data, the song management data including data indicative of a stored position, in said shared storage section, of the audio data corresponding thereto, said method comprising the steps of:
  performing control for sequentially storing the audio data into said shared storage section in a predetermined single direction; and performing control for sequentially storing the song management data into said shared storage section in an opposite direction to the predetermined single direction.

25. A machine-readable storage medium as claimed in claim 24 wherein said method further comprises a step of storing, into a predetermined region, system management data including data indicative of a stored position, in said shared storage section, of the song management data for each of the songs.

26. A machine-readable storage medium as claimed in claim 24 wherein said method further comprises the steps of:
  reading out, from said memory, the song management data of any one of the songs to be reproduced; and
  reading out, from said memory, the audio data on the basis of the song management data read out from said memory.

27. A machine-readable storage medium as claimed in claim 24 wherein said method further comprises a step of
  storing, into a predetermined region, system management data including data indicative of a stored position, in said shared storage section, of the song management data for each of the songs;
  reading out, from said memory, the song management data of any one of the songs to be reproduced, on the basis of the system management data; and
  reading out, from said memory, the audio data on the basis of the song management data read out from said memory.

28. A method of reproducing, in accordance with song management data, audio data of a plurality of tracks stored in a memory, said method comprising the steps of:
  selecting a song, the song including a plurality of tracks, each of the tracks including a plurality of virtual tracks each including a plurality of interlinked regions;
  reading out song management data corresponding to the song selected by said step of selecting, the song managment data including:
    selection information that, for each of said tracks, indicates a virtual track seleted from among the plurality of virtual tracks;
    performance start time information and performance time length information of each of the regions in each of the virtual tracks; and
    position information indicative of stored positions, in a shared storage section of said memory, of audio data corresponding to the regions;
  selecting one of the virtual tracks for each of the tracks, in accordance with the selection information included in the song management data; and
  at timing indicated by the performance start time information, sequentially reading out, from said memory, the audio data in the stored positions indicated by the position information for individual ones of the plurality of interlinked regions in the selected virtual track, and thereby reproducing the audio data for a time indicated by the performance time length information.

29. A method as claimed in claim 28 wherein said memory has clusters as basic storage units thereof and the audio data are stored dispersedly in a plurality of the clusters,
  wherein the song management data include a plurality of interlinked nodes, each of the nodes including address information indicative of an address of the cluster where the audio data is stored, and
  wherein the position information is indicative of any one of the nodes.

30. A method of reproducing, in accordance with management data, audio data of a track from among audio data of a plurality of takes stored in a memory, said memory having clusters as basic storage units thereof, the audio data of each of the takes being stored dispersedly in a plurality of the clusters, said method comprising the steps of:
  reading out management data, the management data including track data including a plurality of interlinked regions and take data including a plurality of interlinked nodes, each of the nodes including address information indicative of an address of the the cluster where the audio data is stored, each of the regions including performance start time information and performance time length information of the region and position information indicative of a leading node of the audio data corresponding to the region; and
  sequentially performing a reproduction process on individual ones of the plurality of interlinked regions on the basis of the nodes indicated by the position information, at timing indicated by the performance start time information and for a time indicated by the performance time length information,
  wherein, for individual ones of the plurality of interlinked nodes starting with the node indicated by the position information, said reproduction process sequentionally reads out, from said memory, the audio data in the stored positions indicated by the address information.

31. A method of reading out, in accordance with song management data, audio data of a plurality of tracks stored in a memory, said method comprising the steps of:
  selecting a song, the song including a plurality of tracks, each of the tracks including a plurality of virtual tracks each including a plurality of interlinked regions;
  reading out song management data corresponding to the song selected by said step of selecting, the song management data including:
    selection information that, for each of said tracks, indicates a virtual track selected from among the plurality of virtual tracks;
    performance start time information of each of the regions in each of the virtual tracks; and
    position information indicative of stored positions, in a shared storage section of said memory, of audio data corresponding to the regions;
  selecting one of the virtual tracks for each of the tracks, in accordance with the selection information included in the song management data; and
  at timing indicated by the performance start time information, sequentially reading out, from said memory, the audio data in the stored positions indicated by the position information for individual ones of the plurality of interlinked regions in the selected virtual track.

32. A method of reading out, in accordance with managment data, audio data of a trackfrom among audio data of a plurality of take stored in a memory, said memory having clusters as basic storage units thereof, the audio data of each of the takes being stored dispersedly in a plurality of the clusters, said method comprising the steps of:
  reading out management data, the management data including track data including a plurality of interlinked regions and take data including a plurality of interlinked nodes, each of the nodes including address information indicative of an address of the cluster where the audio data is stored, each of the regions including performance start time information and position information indicative of a leading node of the audio data corresponding to the region; and sequentially performing a readout process on individual ones of the plurality of interlinked regions on the basis of the nodes indicated by the position information, at timing indicated by the performance start time information, wherein, for individual ones of the plurality of interlinked nodes starting with the node indicated by the position information, said readout process sequentially reads out, from said memory, the audio data in the stored positions indicated by the address information.

* * * * *